United States Patent [19]

Silander

[11] Patent Number: 5,089,086
[45] Date of Patent: Feb. 18, 1992

[54] PROCESS FOR CONTINUOUS COOKING OF CELLULOSE

[75] Inventor: Risto Silander, Helsinki, Finland

[73] Assignee: Jaakko Poyry Oy, Helsinki, Finland

[21] Appl. No.: 514,160

[22] Filed: Apr. 25, 1990

[30] Foreign Application Priority Data

Apr. 27, 1989 [FI] Finland .................................. 892019

[51] Int. Cl.$^5$ .............................................. D21C 3/24
[52] U.S. Cl. ........................................ 162/19; 162/40; 162/47
[58] Field of Search .................... 162/37, 39, 40, 41, 162/43, 60, 62, 19, 47

[56] References Cited

U.S. PATENT DOCUMENTS

| 3,525,665 | 8/1970 | Gessner | 162/19 |
| 3,652,384 | 3/1972 | Sloman | 162/19 |
| 4,578,149 | 3/1986 | Fagerlund | 162/39 |
| 4,764,251 | 8/1988 | Ostman | 162/39 |
| 4,849,052 | 7/1989 | Grant | 162/47 |
| 4,944,840 | 7/1990 | Henricson et al. | 162/47 |
| 4,954,219 | 9/1990 | Gloersen | 162/47 |

*Primary Examiner*—Karen M. Hastings
*Attorney, Agent, or Firm*—Spensley, Horn, Jubas & Lubitz

[57] ABSTRACT

The invention relates to a process for continuous cooking of cellulose. In the process, wood chips (11) are impregnated (1) with cooking lye (10), after which the wood chips impregnated with cooking lye is mixed (27) with spent liquor (18) in order to transfer (12) it into the upper portion of a pressurized digester (2). The transfer liquor used for the transfer of the wood chips in the preceding step is separated (26) from the impregnated wood chips in the upper portion of the digester (2) and is recycled (13,14) to the preceding step. After this, the chips are conducted from the digester (2) downwards into the cooking zone (24) and from there on to the washing zone (24), whereby a mixture of spent lye and wash lye, i.e. spent liquor (18) is removed from between the cooking and washing zones (19) and a portion (21) of the liquor removed from the digester (2) is expansion evaporized (5,6) in order to recover heat in the form of steam (22,23). In order to improve the heat consumption of the method and to reduce the steam consumption, the spent liquor (18) is mixed with the impregnated chips before transferring these into the upper portion of the digester (2), whereas a corresponding portion (21) of the transfer liquor (13) separated from the upper part of the digester (2) is conducted to the expansion evaporation (5,6) and from there on to the chemicals recovery (17). The invention also relates to a device for implementing the above process.

5 Claims, 1 Drawing Sheet

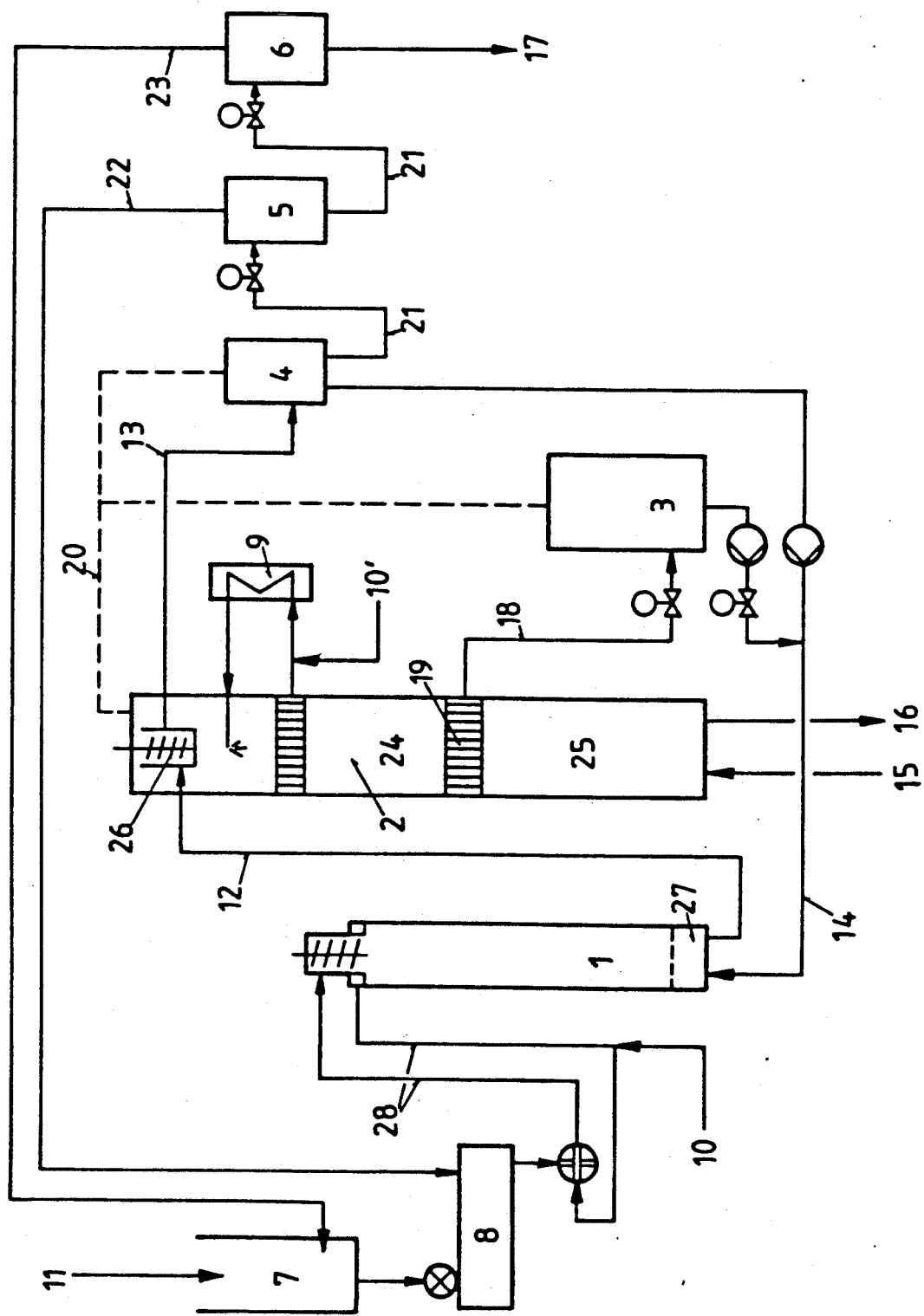

PROCESS FOR CONTINUOUS COOKING OF CELLULOSE

This invention relates to a process and a device for continuous cooking of cellulose and especially to a process and a device, in which the chips are first impregnated with white liquor in a disparate absorption tower, after which the impregnated chips are transferred into the upper portion of a vertical digester for cooking and in which the hot spent liquors obtained from the digester are subjected to expansion evaporation in order to recover heat in the form of steam before conducting the spent liquors to the chemicals recovery.

In two-vessel-digesters of the type described above, the wood chips and cooking liquor are first fed into a pressurized preabsorption tower, having a temperature of approx. 125° C. In this first step of the cooking, the wood chips are impregnated with cooking liquor and most of the reactions take place here, which represent no delignification, but consume alkali. 60–70% of the alkali required for the cooking may be consumed. Subsequently. the chips and the cooking liquor are transferred into the actual digester, in which the temperature is raised so as to bring about delignification. The temperature is generally in the range of 160–170 C and the heating is carried out by conducting high-pressure steam directly into the digester, or by using heat exchangers, over which the cooking liquor is circulated. The mixture of chips-cooking liquor is kept at a cooking temperature, until the desired delignification degree has been obtained. After this the hot spent liquor is separated from the mixture, and is replaced by the colder washing liquor obtained from the cooling or washing zone of the digester. Depending on the amount of wash lye, the mixture of spent lye and wash lye, i.e. spent liquor, is at a cooler or approx. at the same temperature as the cooking zone. In cooking carried out by the sulphate process the liquor is called black liquor.

Usually the spent liquor thus obtained is conducted over one or more expansion evaporation vessels to a supply tank and further to the cooking chemicals recovery plants of the factory.

The said expansion evaporation vessels have a step-wise decreasing pressure. In these expansion evaporation vessels steam is separated from the spent liquor and simultaneously the liquor is cooled to the equilibirum temperature corresponding to the pressure. The produced steam is utilized among others for heating the initial step of the cooking, for the calcination of the chips, for heating the washing step of the digester and for the preparation of hot water.

Recent search results concerning modified cooking conditions give reason to suppose that if in sulphate cooking, black liquor is used in the initial step of the cooking for heating and soaking, the strength and quality of the pulp are considerably improved. These results have been achieved in a discontinuous so-called batch digester plant. The method has not been implemented in a continuous cooking plant.

Thus, a method and device for impregnating chips with cooking liquor in a closed impregnating chamber separated from the actual cellulose digester, of the type mentioned in the introduction of the FI patent specification 33722, are known, proposing hot spent liquor to be used for conveying the impregnated chips to the digester. However, according to prior art, heat has been recovered from this spent liquor in a usual manner by means of expansion evaporation.

The purpose of the present invention is thus firstly to improve the heat economy of such digesters and additionally to improve the quality of the cooked pulp, the turpentine yield, to reduce the consumption of cooking chemicals, the viscosity of the spent liquor and to improve the reliability of the digester.

The main characteristics of the invention will be described below and defined in the accompanying claims.

In the process according to the present invention, substantially the total amount of hot spent liquor separated from the digester and being under the pressure of the digester is used for transferring the impregnated chips to the upper portion of the digester, whereby the heat energy contained in the spent liquor is recovered as efficiently as possible in the cooking process. Only after this, when the liquor used for the transfer has been separated from the chips in the upper portion of the digester, part of this transfer liquor is subjected to expansion evaporation in an ordinary manner in order to recover heat in the form of steam before it is conducted to the chemicals recovery. The spent liquor separated from the digester is mixed with the thus totally impregnated chips, whereas a corresponding part of the transfer liquor separated from the upper portion of the digester is conducted to expansion evaporation and from there on to the chemicals recovery.

Thus, the method and device of the present invention enable to directly utilize a greater part of the heat content of the spent liquor removed from the digester for heating the liquor without having to first expansion evaporize this spent liquor in order to produce steam, which then would be used for heating the cooking. Thus, the process of the invention enables to raise the temperature of the impregnated chips to be transferred to the digester from the usual approx. 125° C. to approx. 140°–145° C. In this case only half of the normal steam consumption is needed. In spite of this, heat can still be recovered from the spent liquor by expansion evaporating it, the steam amount obtained being still sufficient for the heating needs in the initial step of the cooking. As a whole, the process of the invention considerably improves the heat economy of a continuous digester.

Studies have revealed that the viscosity of black liquor obtained in sulphate cooking decreases if it is kept alkaline at a high temperature. This is an advantage for the further treatment of the liquor, its evaporation, pumping, storage and combustion. The method and device of the invention enable to keep the spent liquor at a high temperature during an optional period, thus providing favourable conditions for the reactions leading to a reduction of the liquor viscosity. In a preferred embodiment of the invention, hot pressurized black liquor separated from the cooking is conducted with a lag over the closed spent liquor vessel into the transfer liquor cycling.

In a continuous sulphate plant, the recovery of turpentine substances is notoriously incomplete. The turpentine substances are concentrated in the cycles of the digester, a major part accompanying the pulp and evaporating in the various production departments. The process of the invention enables to improve the turpentine recovery, in that these substances are more completely concentrated in the black liquor.

The residual alkali of the spent liquor can be high for many reasons. A great amount of residual alkali involves higher costs for the cooking chemical recovery and larger recovery plants are also needed for this purpose. In some cases, the amount of residual alkali may be one third of the active cooking chemicals batched in the cooking. In the process according to the invention, residual alkali is recycled and thus a smaller consumption of cooking chemicals is made possible. The importance of this is emphasized in a so-called continued cooking process. In the process of the invention, wood chips are thus impregnated with essentially such an amount of cooking liquor that is required by the impregnation at this stage, whereas the remaining cooking liquor is conducted to the upper portion of the digester before the cooking zone.

In an ordinary continuous digester, the cooking liquor is removed from the pressure of the digester through an adjusting valve under a remarkably low pressure. The digester is provided with screens for the separation of the liquor. In case the screens are clogged, a pressure difference of up to 10 bars may arise above them. The screens are not generally constructed to resist such pressures and easily break. In a preferred embodiment of the invention, so high a pressure difference cannot arise above the screens thus improving the working safety of the digester. In one embodiment of the invention, the upper portion of the spent liquor vessel and the transfer liquor vessel are connected with the upper portion of the digester, thus maintaining the same steam pressure in all of these. In this case, the spent liquor vessel is preferably disposed lower than the screen, between the cooking zone and the washing zone, in order to produce a pressure difference between the digester and the spent liquor vessel. In this embodiment, no great pressure differences can arise above the screen, the highest pressure difference being the hydrostatic pressure generated by the height difference of the liquid surfaces.

BRIEF DESCRIPTION OF THE DRAWING

The invention is described in greater detail below with reference to the enclosed drawing, showing a flow chart of the preferred embodiment of the invention.

In the drawing, the soaking tower is generally indicated with the reference 1 and the pessurized digester generally with the reference 2. The chips 11 are fed into the chips silo 7 and are batched into the calcination vessel 8, in which the chips are calcinated with steam 22. The chips can be heated with steam 23 already in the chips silo 7. In the calcination vessel 8, the chips are fed into the soaking tower 1 with the cooking liquor 10, which is led into the cooking liquor cycle 28, while the excessive cooking liquor is separated from the upper portion of the soaking tower 1 and is recycled into the cooking liquor cycle 28. Such an amount of cooking liquor 10 as is needed for the soaking is added, i.e. only the amount of alkali that is consumed during the soaking. In the lower portion 27 of the soaking tower, such a amount of spent liquor is mixed into the impregnated chips from the pipe 14 that the chips will be transferred in the pipe 12 into the upper portion of the pressurized digester 2. The upper portion of the digester 2 comprises a separator 26, by means of which the chips are separated from the cycled liquor, which is recycled in the pipe 13 and further in the pipe 14 into the lower portion 27 of the soaking tower.

The remaining cooking liquor 10′ is added after heating in the preheater 9 into the digester 2 before the cooking zone 24. Below the cooking zone 24 a washing zone 25 is provided into the lower end of which washing liquor 15 is added and washed pulp 16 is removed. Between the cooking and washing zone a screen 19 is provided, by means of which the mixture of spent lye and washing lye, i.e. spent liquor is separated from the digester and is led by the pipe conduct 18 into a closed spent liquor vessel 3 and from there on with a lag into the transfer liquor cycle, i.e. the pipe 14. Between the pipes 13 and 14 a transfer liquor vessel 4 can be disposed, connected by the pipe 21 with the first expansion evaporator 5, providing steam 22, and further with a second expansion evaporation vessel 6, providing steam 23, and from where the cooled liquor obtained is conducted to the evaporating plant 17 for chemicals recovery. From the transfer liquor vessel 4 an amount of liquor is removed through the pipe 21 for expansion evaporation that is equal to the amount of spent liquor recycled from- the digester 2 in the pipe 18 through the spent liquor vessel 3 into the transfer liquor cycle.

The upper portions of the spent liquor vessel 3 and the transfer liquor vessel 4 are connected with the upper portion of the digester 2, so as to bring their steam chambers under the same pressure. Then the spent liquor vessel 3 has been disposed on such a level that its liquid level is considerabily lower than that of the digester 2, preferably 10–50 metres lower, depending on the size of the digester and the spent liquor vessel. The liquor flows from the digester 2 along the pipe 18 into the spent liquor vessel 3 only owing to the hydrostatic pressure difference between these, and in this manner the screen 19 is not subjected to any pressure difference high enough to cause breaking.

In the process and device according to the invention the total heat content of the spent liquor 18 is recovered for the heating of the impregnated chips in the pipe 12 and nevertheless sufficient steam 22 and 23 for the heating and calcination 8 of chips is obtained by expansion evaporation 5 and 6 from the spent liquor 21 removed from the transfer liquor cycle 12, 13 and 14. The recovery of turpentine substances is facilitated, since they are more completely concentrated into the removed spent liquor flow (21). As the spent liquor vessel 3 is under the same pressure as the digester 2, the screen is not subjected to high pressure differences, but only to the hydrostatic pressure difference that is determined by the differences between the surface levels of the digester 2 and the spent liquor vessel 3. Moreover, the spent liquor vessel can be made great enough to allow a sufficient reaction time for reducing the viscosity of the spent liquor.

I claim:
1. A process for continuous cooking of cellulose initially contained in wood chips, comprising the steps of:
 a) impregnating wood chips (11) with cooking liquor (10);
 b) mixing (27) the wood chips impregnated with cooking liquor from step a) with spent liquor (18) and transferring the resulting mixture to an upper portion of a pressurized digester (2);
 c) separating, in the upper portion of the pressurized digester (2), the liquor from the impregnated wood chips of the mixture formed in step b) and recycling (13,14) part of the separated liquor as spent liquor to step b);
 d) conducting the wood chips separated in step c), together with liquor, downwardly through the digester (2) to a cooking zone (24) and then into a washing zone (25);

e) removing liquor from a region between the cooling and washing zones as spent liquor; and f) expansion evaporating part of the liquor separated from the wood chips in step c) in order to recover heat in the form of steam; wherein g) steps e) and f) are performed so that the liquor removed in step e) constitutes liquor conducted to step b) and is equal in amount to the liquor evaporated in step f), and further comprising conducting the liquor evaporated in step f), after evaporation, to a chemical recovery system.

2. A process according to claim 1, characterized int hat the spent liquor (18) removed in step e) is led with a lag through a closed space (3) to step b).

3. A process according to claim 1, characterized in that the upper portion of the digester (2) is kept in the vapor phase.

4. A process according to claim 3 characterized in that the closed space has an upper portion containing a vapor phase of the spent liquor at the same pressure as the vapor phase at the upper portion of the digester.

5. A process according to claim 1 characterized in that step a) comprises:

adding to the wood chips an amount of cooking liquor greater than that which impregnates the chips and;

conducting additional cooking liquor to the upper portion of the digester ahead of the cooking zone.

* * * * *